United States Patent
Hughes, Jr.

(10) Patent No.: US 7,523,169 B1
(45) Date of Patent: Apr. 21, 2009

(54) METHOD AND SYSTEM FOR MAPPING NETWORK DATA FOR NETWORK DATABASE ACCESS

(75) Inventor: George L. Hughes, Jr., Wesley Chapel, FL (US)

(73) Assignee: Verizon Data Services LLC, Temple Terrace, FL (US)

( * ) Notice: Subject to any disclaimer, the term of this patent is extended or adjusted under 35 U.S.C. 154(b) by 831 days.

(21) Appl. No.: 10/376,070

(22) Filed: Feb. 28, 2003

(51) Int. Cl.
*G06F 15/16* (2006.01)

(52) U.S. Cl. .......................................... 709/216; 707/3

(58) Field of Classification Search ......... 709/212–217, 709/226; 711/170, 173; 707/3
See application file for complete search history.

(56) References Cited

U.S. PATENT DOCUMENTS

| | | | |
|---|---|---|---|
| 5,511,197 A | 4/1996 | Hill et al. ..................... 395/700 |
| 5,566,302 A | 10/1996 | Khalidi et al. ......... 395/200.09 |
| 5,577,251 A | 11/1996 | Hamilton et al. ............ 395/671 |
| 5,724,588 A | 3/1998 | Hill et al. ..................... 395/684 |
| 5,737,607 A | 4/1998 | Hamilton et al. ............ 395/701 |
| 5,774,465 A | 6/1998 | Lau et al. ..................... 370/397 |
| 5,787,251 A | 7/1998 | Hamilton et al. ....... 395/200.33 |
| 6,016,513 A | 1/2000 | Lowe .......................... 709/260 |
| 6,336,148 B1 | 1/2002 | Doong et al. ................ 709/316 |
| 6,356,938 B1 | 3/2002 | Munoz et al. ................ 709/208 |
| 6,385,209 B1 | 5/2002 | Skirmont et al. ............. 370/419 |
| 6,418,478 B1 | 7/2002 | Ignatius et al. .............. 709/240 |
| 6,430,607 B1 * | 8/2002 | Kavner ........................ 709/217 |
| 6,438,128 B1 | 8/2002 | Kashyap ...................... 370/389 |
| 6,571,326 B2 * | 5/2003 | Spiegel et al. ............... 711/170 |
| 6,622,199 B1 * | 9/2003 | Spall et al. ................... 711/103 |
| 6,934,821 B2 * | 8/2005 | Kubooka et al. ............. 711/159 |
| 6,961,828 B2 * | 11/2005 | Hirayama .................... 711/150 |
| 6,996,694 B1 * | 2/2006 | Muthukkaruppan ......... 711/170 |
| 7,185,172 B1 * | 2/2007 | Mick et al. ................... 711/206 |
| 7,266,132 B1 * | 9/2007 | Liu et al. ...................... 370/538 |
| 2001/0042058 A1 * | 11/2001 | Harrington et al. ............. 707/1 |
| 2002/0101426 A1 * | 8/2002 | Okamura ..................... 345/530 |
| 2002/0129192 A1 * | 9/2002 | Spiegel et al. ............... 711/103 |

\* cited by examiner

*Primary Examiner*—Salad Abdullahi

(57) ABSTRACT

Methods and systems for mapping data from a network to memory. A node receives a data map from a network. The data map is reflective of characteristics of data associated with the data map. Based on the data map, the computer allocates a section of a memory of the computer. The computer also receives the data associated with the data map from the network and loads the received data into the allocated memory based on the data map. Thereafter, the computer may also get at least one search parameter, search the allocated memory for data that meets the at least one search parameter using the data map, and copy data that meets the at least one search parameter.

33 Claims, 8 Drawing Sheets

600

| Identifier | Character | Starting Position: 0<br>Length: 3 |
|---|---|---|
| Last Name | Character | Starting Position: 3<br>Length: 10 |
| First Name | Character | Starting Position: 13<br>Length: 10 |
| Employee Number | Integer | Starting Position: 23<br>Length: 5 |
| Salary | Integer | Starting Position: 28<br>Length: 5 |
| Title | Character | Starting Position: 33<br>Length: 10. |

FIG. 6

| a1 | hughes | george | 1111 | 10000 | director |
| --- | --- | --- | --- | --- | --- |
| a2 | reding | craig | 2222 | 11000 | director |
| a3 | lepage | cathy | 3333 | 12000 | finance |
| a4 | esapovich | wendy | 4444 | 13000 | admin |
| a5 | hughes1 | george | 5555 | 10000 | director |
| a6 | reding1 | craig | 6666 | 11000 | director |
| a7 | lepage1 | cathy | 7777 | 12000 | finance |
| a8 | esapovich1 | wendy | 8888 | 13000 | admin |
| a9 | hughes2 | george | 9999 | 10000 | director |

METHOD AND SYSTEM FOR MAPPING NETWORK DATA FOR NETWORK DATABASE ACCESS

FIELD OF THE INVENTION

The present invention relates generally to data processing systems and, more particularly, to a method and system for mapping network data for network database access.

DESCRIPTION OF RELATED ART

As more and more businesses and individuals increase their use of networks, the demand for increased data capacity and efficiency in network traffic continues to increase dramatically. A computer retrieving data from a network often does so with the aid of a network interface card (NIC). A NIC is an adapter circuit board installed in a computer to provide a physical connection to a network. Essentially, a NIC works with the operating system of a computer to control the flow of information over a network. A NIC typically requires a device driver that controls the physical functions of the NIC and coordinates data transfers between the NIC and the operating system.

A NIC in a computer may be used to parse data retrieved from a network to place that data into memory. An operating system resident on the computer may further need to parse the data stored in the memory to determine what should be done with that data. The parsing performed by the NIC and operating system serves to slow the retrieval of data from the network so that data traverses over the network faster than it can be retrieved. Accordingly, there is a need for a method and system for improving the manner in which data is retrieved from a network.

SUMMARY OF THE INVENTION

Methods and systems consistent with the principles of the invention map data from a network to memory. A node receives a data map from the network reflective of characteristics of data associated with the data map. The characteristics may include various information including data field information and data size information. The node allocates a section of the memory based on the data map and receives, from the network, the data associated with the data map. Thereafter, the node loads the received data into the allocated memory based on the data map.

Other methods and systems consistent with the principles of the invention also map data from a network to memory in a computer. A node generates a data map reflective of characteristics of data to be transferred to the computer and associates the data map with the data to be transferred to the computer. The node then sends the data map and associated data to the computer. The computer receives the data map from the network, allocates a section of the memory based on the data map, receives the associated data from the network, and loads the associated data into the allocated memory based on the data map.

Other methods and systems consistent with the principles of the invention also map data from a network to memory. A node receives a data map from the network reflective of characteristics of data associated with the data map. The node allocates a section of the memory based on the data map and receives, from the network, the data associated with the data map. The node then loads the received data into the allocated memory based on the data map. In addition, the node gets at least one search parameter, searches the allocated memory for data that meets the at least one search parameter using the data map, and copies data that meets the at least one search parameter.

Other methods and systems consistent with the principles of the invention also map data from a network to memory. A first node generates a data map reflective of characteristics of data to be transferred to a second node. The first node also associates the data map with the data to be transferred to the second node and sends the data map and associated data to the second node. The second node receives the data map from the first node via the network. Based on the data map, the second node allocates a section of a memory of the second node. The second node also receives the data associated with the data map from the network and loads the received data into the allocated memory based on the data map. Thereafter, the second node may also get at least one search parameter, search the allocated memory for data that meets the at least one search parameter using the data map, and copy data that meets the at least one search parameter.

BRIEF DESCRIPTION OF THE DRAWINGS

The accompanying drawings are incorporated in and constitute a part of this specification and, together with the description, explain the features and principles of the invention. In the drawings:

FIG. 6 is another diagram of an exemplary data map consistent with the present invention;

FIG. 7 is an example of a data map implemented in a manner consistent with the principles of the present invention.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the principles of the invention map data from a network to memory. A first computer generates a data map reflective of characteristics of data to be transferred to a second computer. The first computer also associates the data map with the data to be transferred to the second computer and sends the data map and associated data to the second computer. The second computer receives the data map from the first computer via the network. Based on the data map, the second computer allocates a section of a memory of the second computer. The second computer also receives the data associated with the data map from the network and loads the received data into the allocated memory based on the data map. Thereafter, the second computer may also get at least one search parameter, search the allocated memory for data that meets the at least one search parameter using the data map, and copy data that meets the at least one search parameter.

Network Environment

Figure 1:
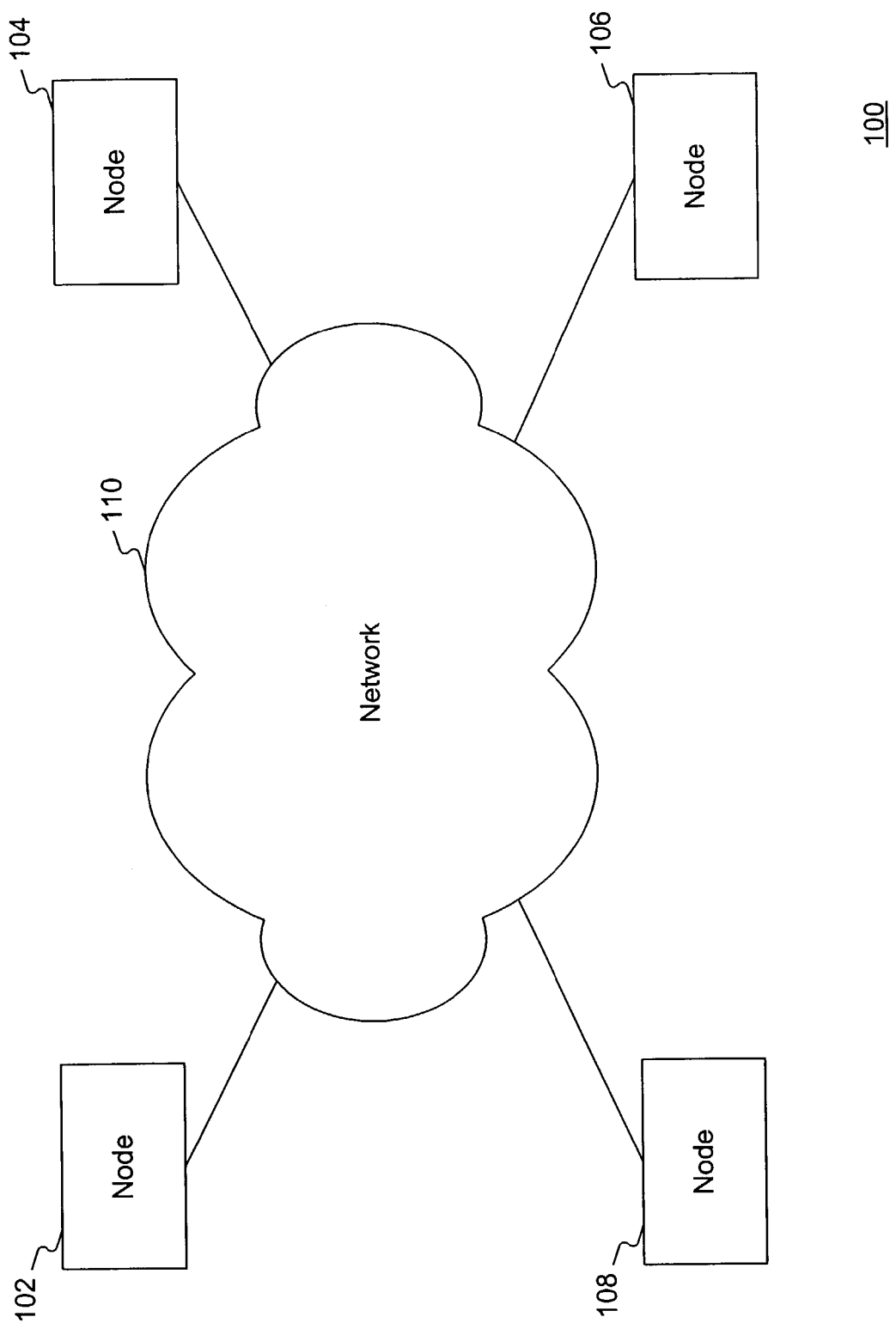
FIG. 1 is a diagram of an exemplary network environment in which features and aspects consistent with the present invention may be implemented.

FIG. 1 is a diagram of an exemplary network environment in which features and aspects consistent with the present invention may be implemented. Network environment 100 comprises a number of nodes 102-108 connected through a network 110. The components of FIG. 1 may be implemented through hardware, software, and/or firmware. The number of components in network environment 100 is not limited to what is shown and other variations in the number and arrangement of the components are possible, consistent with embodiments of the present invention.

Nodes 102-108 may comprise computers that are operable to send and/or receive information over network 110. This information may include at least a data map and data associated with that data map. The data map may include characteristics related to the associated data so that a receiving node may map the data to memory to allow for faster retrieval. Network 110 may comprise a public and/or private network implemented through any suitable combination of wired and/or wireless communication networks. By way of example, network 110 may be implemented through a local area network (LAN), an intranet and/or the Internet.

Figure 2:
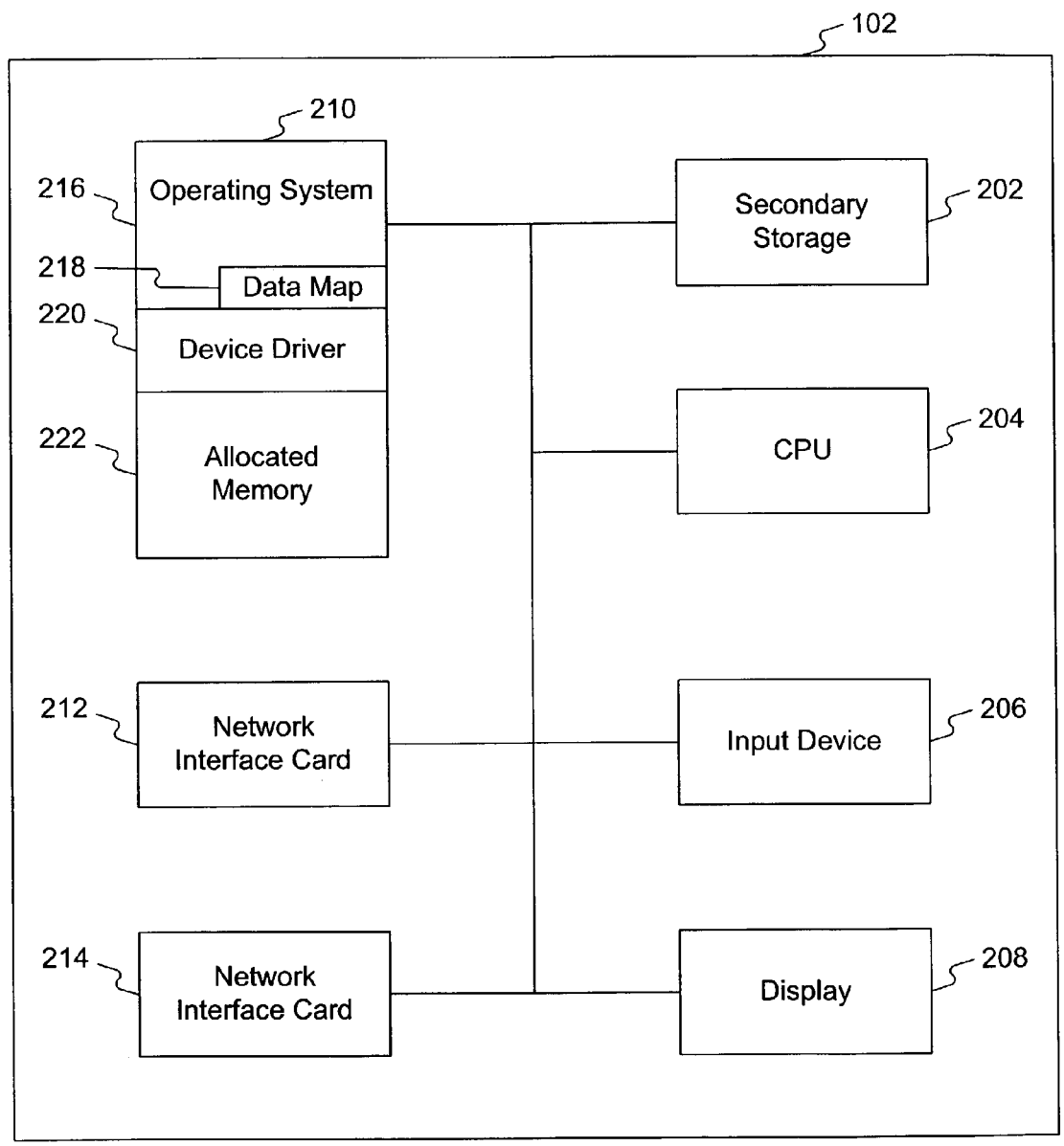
FIG. 2 is a diagram of an exemplary node consistent with the present invention.

FIG. 2 is a diagram of an exemplary node consistent with the present invention. As illustrated in FIG. 2, a node, such as node 102, may include a number of components, such as secondary storage 202, a CPU 204, an input device 206, a video display 208, a memory 210, and/or network interface cards 212 and 214. One or more of these components may be substituted, removed or modified as needed. Further, other components may be added or incorporated into the node, consistent with embodiments of the invention. Moreover, as will be appreciated by those skilled in the art, the node and its associated components may be implemented using a workstation, a personal computer, a laptop, PDA or any other type of computing platform.

CPU 204 may be one or more known processing devices, such as a Pentium™ microprocessor manufactured by Intel Corporation. Memory 210 may be one or more storage devices configured to store data used by CPU 204 to perform certain functions related to embodiments of the present invention. Memory 210 may be a magnetic, semiconductor, tape, or optical type of storage device. Secondary storage 202 may also be implemented with similar storage devices.

Software and other applications may be loaded into secondary storage 202 and/or memory 210 using, for example, a computer readable medium with a software or program application that is read by secondary storage 202. Software may also be installed via network 110 and network interface cards 212 and/or 214. Control of the node 102 as well as data input by a user may be achieved through input device 206, which may comprise a keyboard, a pointer device, a mouse, etc. Data output may be presented to a user of the client through display 208 and/or another output device (such as a printer—not shown).

Network interface cards 212-214 may facilitate communication between the node 102 and other nodes through network 110. The network interface cards 212-214 may be operable to send or receive one or more data maps and data associated with those data maps. Upon receiving a data map or data, a network interface card 212 or 214 may pass the data map or data to a device driver, such as device driver 220. In one embodiment, network interface cards 212 and 214 may be responsible for different types of network traffic. For example, one of network interface card 212 or 214 may handle existing network communication and the other may handle data traffic that relates to data maps. Alternatively, a network interface card 212 or 214 may handle both types of traffic.

Memory 210 may include an operating system 216, a device driver 220, and allocated memory 222. Operating system 216 may include a data map 218, which may be received by one of the network interface cards 212 or 214 from a sending node. Data map 218 may include characteristics of data associated with data map 218 and may be used to allocate an appropriately sized section of memory 210 for this associated data, such as allocated memory 222. Device driver 220 receives the data map 218 and associated data from a network interface card 212 or 214, allocates an appropriately sized section of memory 210 (e.g., allocated memory 222) based on the data map 218, and loads the data map 218 into operating system 216. That way, as data is received from the network 110, it may be loaded into allocated memory 222 and operating system 216 already has an index map to the data. This makes it possible to increase the MTU (Maximum Transmission Unit) size of data to consume more network capacity (e.g., close to or at 100%) without fear that there will not be enough time to process received data due to the speed of the data.

Figure 3:
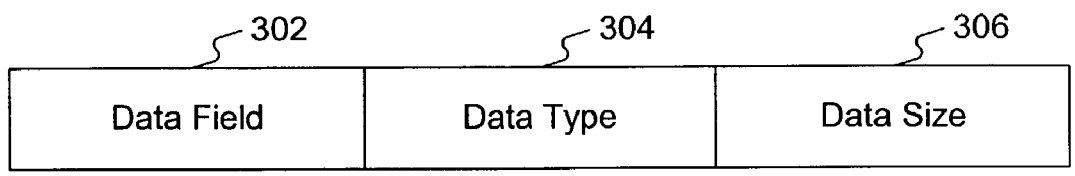
FIG. 3 is a diagram of an exemplary data map consistent with the present invention.

FIG. 3 is a diagram of an exemplary data map consistent with the present invention. A data map 218 may include information reflecting data field 302, data type 304, and data size 306. Data field 302 may specify the particular names of data fields associated with data corresponding to data map 218. For example, data field information may indicate that data includes a name field, a phone number field, a street address field, an e-mail address field, an employee number field, a salary field, a title field, etc. Data type 304 may specify the kind of data associated with a corresponding data field. For example, a particular data field may be integer data, character data, real data, floating point data, Boolean data, etc. Data size 306 may specify the dimensions of data to be associated with particular data fields. For example, a data size associated with a first name data field may indicate that first name data should start at a particular location within a stream of data and have a particular length. In this manner, an operating system with a data map that includes data size information may know exactly where to skip to in memory to store or search for certain data.

System Operation

Figure 4:
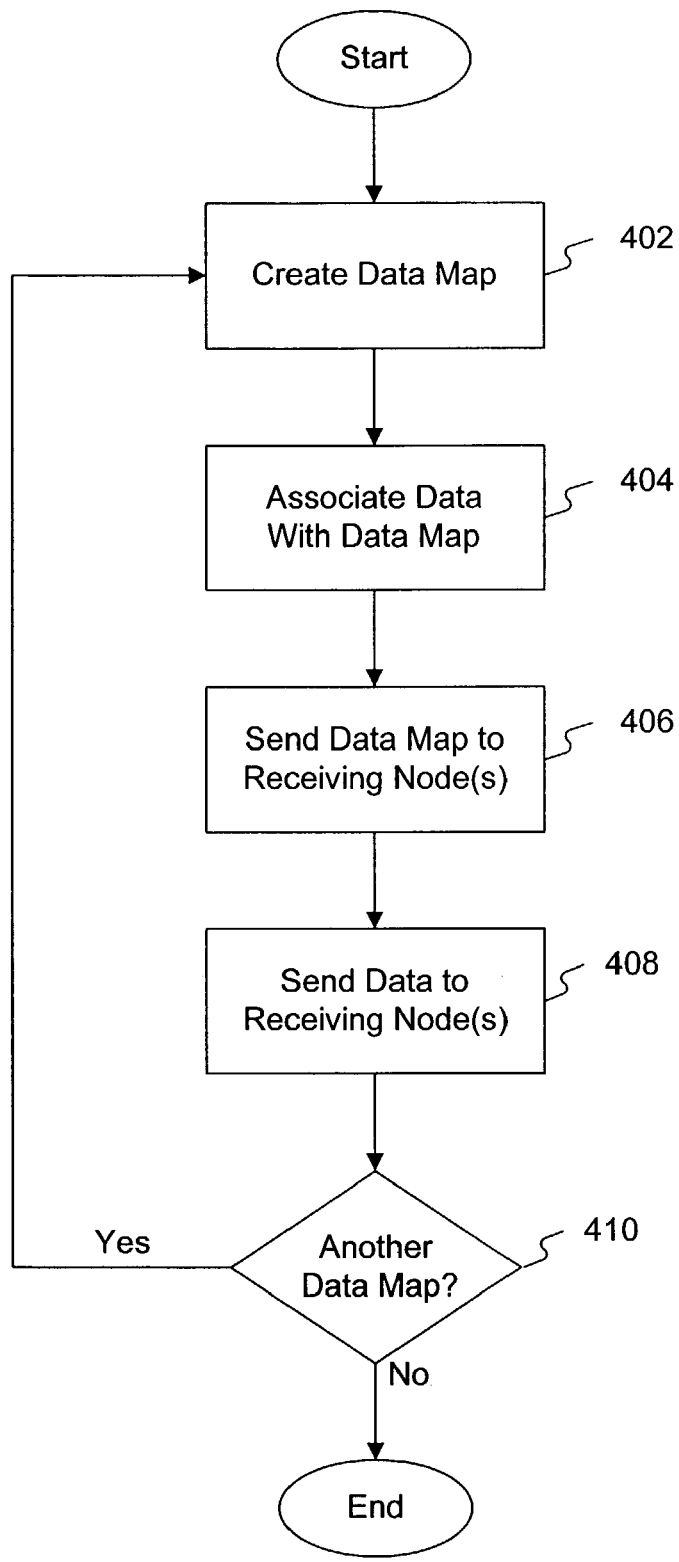
FIG. 4 is a diagram of an exemplary flowchart of a method for sending a data map and accompanying data to a receiving node in a manner consistent with the present invention.

FIG. 4 is a diagram of an exemplary flowchart of a method for sending a data map and accompanying data to a receiving node in a manner consistent with the present invention. Although the steps of the flowchart are described in a particular order, one skilled in the art will appreciate that these steps may be performed in a modified or different order. Further, one or more of the steps in FIG. 4 may be performed concurrently or in parallel.

As illustrated in FIG. 4, a sending node, such as one of nodes 102-108, creates a data map (step 402). The data map may be similar to that described in connection with FIG. 3 above, in that it may include information indicative of data fields, data types, and data size. In one embodiment, a user of the sending node may provide the node with the information needed to create the data map. This information may be used immediately by the sending node to create the data map, or stored by the sending node for later creation. Thereafter, the sending node may associate data with the data map (step 404). In one embodiment, a user of the sending node may provide the node with the data to associate with the data map. This data may be used immediately by the sending node or stored by the sending node for later use.

The sending node may then send the data map to one or more receiving nodes, such as one or more of nodes 102-108 (step 406). By sending the data map to a receiving node, the sending node informs the receiving node of the characteristics of the associated data. When sending the data map, the sending node may incorporate the data map as part of a datagram, packet, frame, or similar data structure. The sending node also proceeds to send the corresponding data to one or more receiving nodes (step 408). Because the receiving node has a data map describing the characteristics of the data, the receiving node may store the data without the need to parse the data to place it in memory.

After sending all of the data that corresponds to the data map to the receiving node, the sending node may determine whether another data map needs to be sent (step 410). If so, then the next data map may be created (step 402) and the process proceeds as previously described. If another data map has already been created and stored, the sending node may retrieve the data map and proceed to step 404 instead of creating a new data map.

Figure 5:
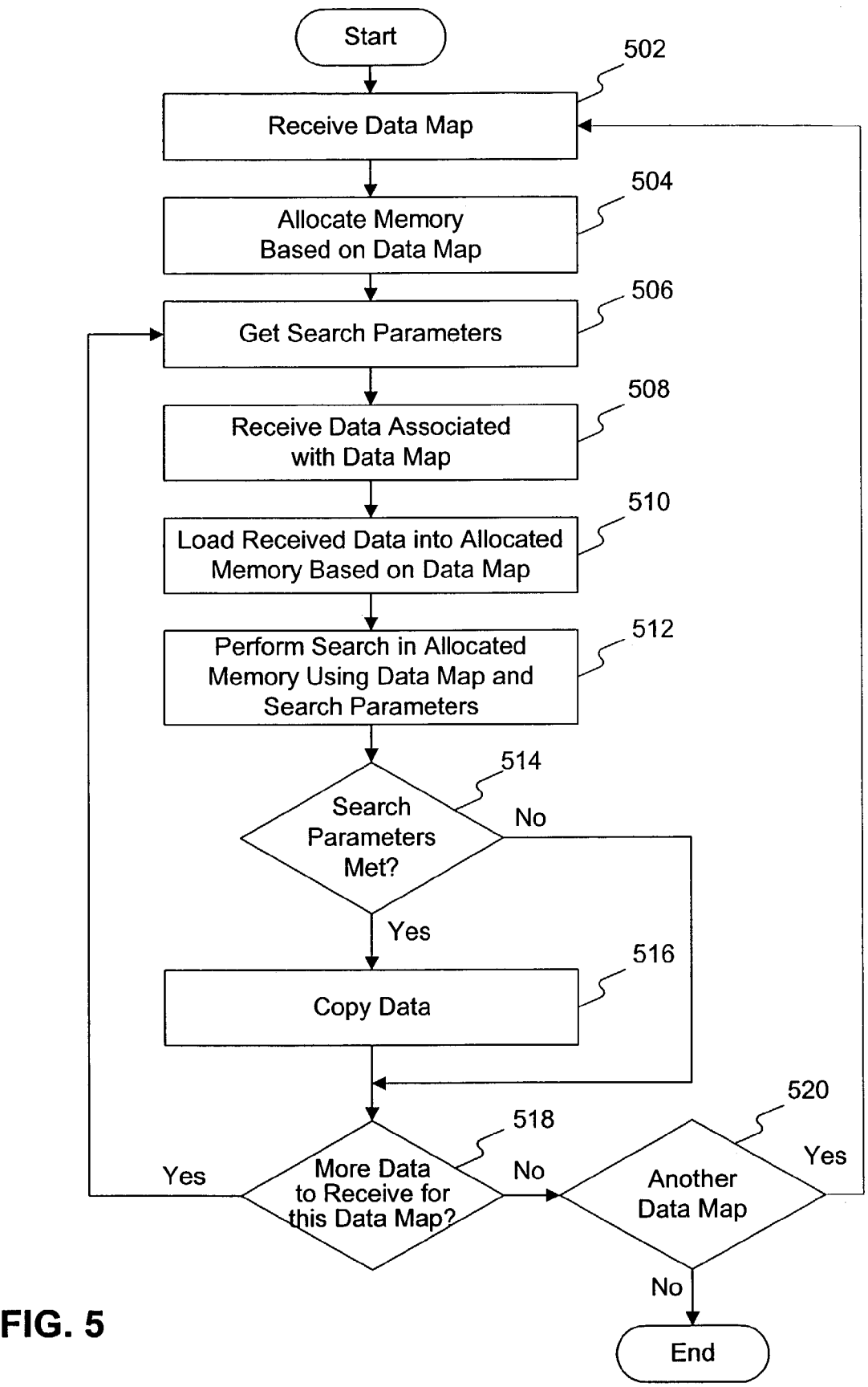
FIG. 5 is a diagram of an exemplary flowchart of a method for receiving and processing a data map and accompanying data in a manner consistent with the present invention.

FIG. 5 is an exemplary flowchart of a method for receiving and processing a data map and accompanying data in a manner consistent with the present invention. Although the steps of the flowchart are described in a particular order, one skilled in the art will appreciate that these steps may be performed in a modified or different order. Further, one or more of the steps in FIG. 5 may be performed concurrently or in parallel.

As illustrated in FIG. 5, a receiving node, such as one of nodes 102-108, receives a data map from a sending node (step 502). For example, the receiving node may receive the data map from the sending node at a network interface card, such as network interface card 212 or 214. In one embodiment, the data map may be encapsulated by the sending node in a datagram, frame, packet, or similar data structure. A sample data map is illustrated in FIG. 6. Data map 600 includes column 602, column 604, and column 606, which correspond to data fields, data types, and data sizes, respectively. As such, data map 600 includes an identifier data field of type character, with a starting position of zero and a length of three. Other data fields include last name, first name, employee number, salary, and title. Each data field has a corresponding data type and size.

After receiving the data map, the receiving node may allocate a section of its memory based on the data map (step 504). For example, the network interface card 212 or 214 may pass the data map to a device driver, such as device driver 220. The device driver may examine the data map, and based on the data size, data field, and/or data type information in the data map, the device driver may reserve appropriately sized sections of memory for particular fields. The device driver may also load the data map into an operating system, such as operating system 216, where the operating system may later use the data map as an index to data.

The receiving node may also get a number of search parameters (step 506). For example, the receiving node may need to search for specific data from the allocated memory. In one embodiment, a user of an application program on the receiving node may provide the receiving node with the search parameters. Search parameters may be in the form of a specific data field name, value of data associated with a field, etc. By way of example, a user may be searching for data that is in a column (e.g., field) called "last name" that has a value of "Hughes." The user may provide such search parameters to the receiving node, where the receiving node will search for the data at the appropriate time.

The receiving node may additionally receive data associated with the data map (step 508). The receiving node may receive the data from the sending node at a network interface card, such as network interface card 212 or 214. The network interface card may temporarily store the received data in a buffer, where the data stays until it is placed in an appropriate location in the allocated memory. Thereafter, the receiving node takes the received data from the aforementioned buffer and loads it into the allocated memory based on the data map (step 510). For example, data may be sent from a sending node to a receiving node. The data may include a number of columns that correspond to the different data fields in the data map, with each row corresponding to a different set of data. A particular data value may be stored in a section of the allocated memory with a data size corresponding to the appropriate data field from the data map.

Sample data is illustrated in FIG. 7. Data 700 includes column 702, column 704, column 706, column 708, column 710, and column 712, which correspond to the identifier field, last name field, first name field, employee number field, salary field, and title field from the sample data map 600, respectively. For example, the set of data from the first row in data 700 has an identifier field with the value "a1," a last name field with the value "hughes," a first name field with the value "george," an employee number field with the value "1111," a salary field with the value "salary," and a title field with the value "director." One of ordinary skill in the art will recognize that alternative fields and values can be used as data.

Figure 8:
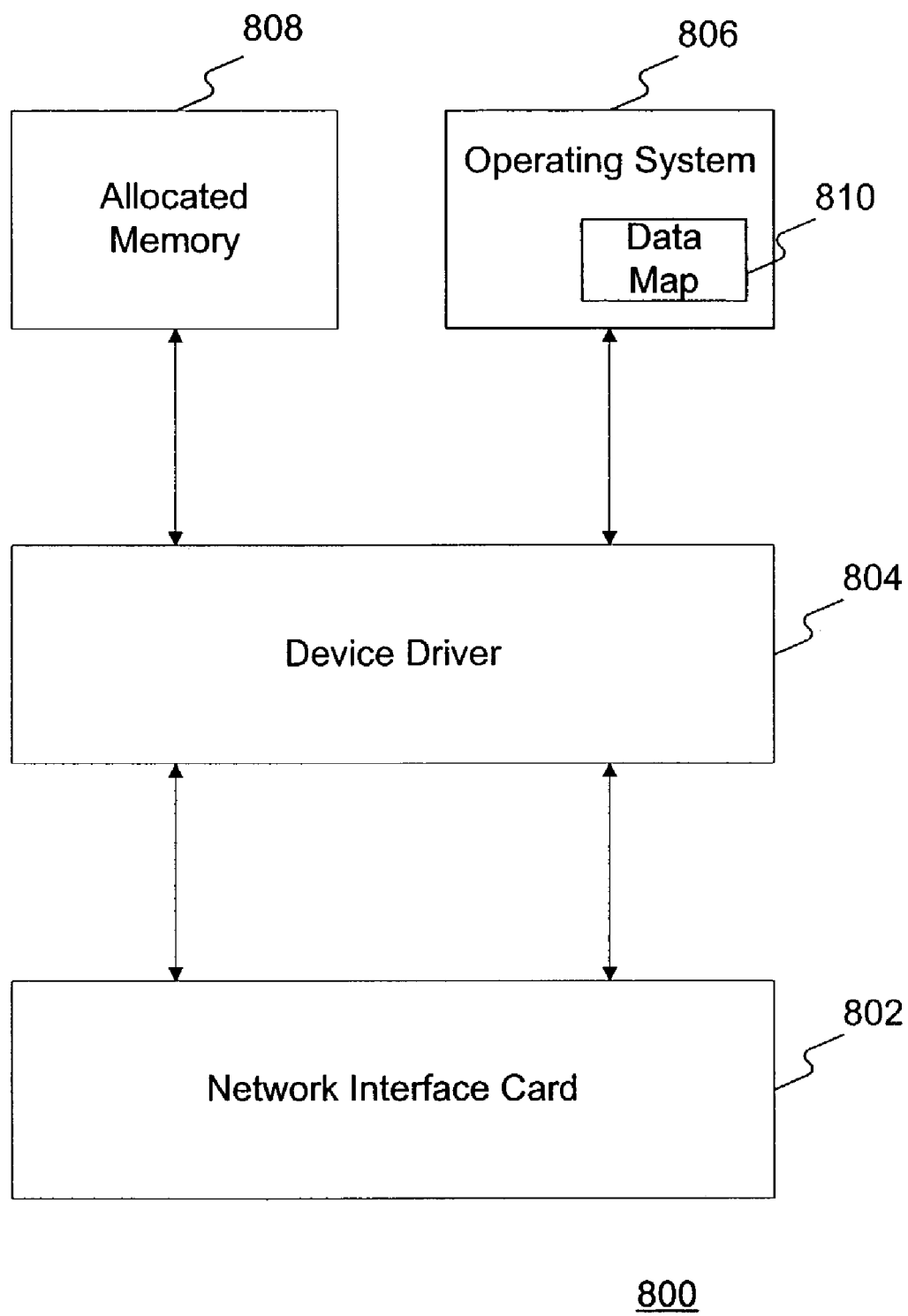
FIG. 8 shows an exemplary computer environment in which a data map corresponding to data is used to allocate memory for that data consistent with the present invention.

FIG. 8 shows an exemplary computer environment 800 in which a data map corresponding to data is used to allocate memory for that data. A network interface card 802 in the computer environment 800 may receive a data map, such as data map 810, from another computer (not shown) via a network (not shown). A device driver 804 may in turn receive the data map 810 from the network interface card 802. Device driver 804 may be generally operable to control network interface card 802 and move data packets between network interface card 802 and other hardware and/or software of computer environment 800. For example, device driver 804 may create allocated memory 808 based on data map 810 and pass data map 810 to an operating system 806. Thereafter, as any data that is related to data map 810 is received, it may be loaded into allocated memory 808 and operating system 806 may use data map 810 as an index map to the data in allocated memory 808.

Returning to FIG. 5, once the data has been loaded into the allocated memory, the receiving node may perform a search in the allocated memory using the data map and search parameters (step 512). For example, operating system 216 may use data map 218 to go directly to an area of the allocated memory that corresponds to a particular data field, for the purpose of looking for a particular value. By using the data map 218 in this manner, the operating system 216 does not have to parse memory space. Instead, it may skip right to the appropriate locations in memory. This saves time in searching for data and decreases the risk that data is overwritten before a determination is made whether it is needed for later use. In performing the search, the receiving node determines whether the search parameters have been met (step 514). In other words, the receiving node decides whether data has been found that is needed for some purpose. If the search parameters have been met, the needed data may be copied and stored for later use (step 516). In one embodiment, data that meets the search parameters may be stored in an area in memory outside of the allocated memory. In this manner, needed data may be saved before the allocated memory in which the data resides is overwritten with new data.

After the needed data is copied for later use, or when none of the search parameters have been met, the receiving node may determine whether data from this data map is still being received (step 518). If so, then the process may proceed back to step 506 to get different search parameters. If, however, there is no more data for the current data map, a determination is made as to whether there is a new data map (step 520). If there is another data map, the receiving node may receive the new data map and the process may be repeated.

While the present invention has been described in connection with various embodiments, many modifications will be readily apparent to those skilled in the art. Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave, optical signal or digital signal from a network, such as the Internet; or other forms of RAM or ROM either currently known or later developed. Additionally, although a number of the software components are described as being located on the same machine, one skilled in the art will appreciate that these components may be distributed over a number of machines. The invention, therefore, is not limited to the disclosure herein, but is intended to cover any adaptations or variations thereof.

What is claimed is:

1. A method for mapping data from a network to a memory in a node, comprising:
   receiving from the network a data map reflective of characteristics of data to be received at the node via the network, wherein the data map provides at least data type and format information that enables determination of how the data is to be stored in the memory;
   allocating a section of the memory based on the data map;
   receiving, from the network, the data associated with the data map;
   directly loading the received data into the allocated memory according to at least the data type and format information provided in the data map;
   receiving, from a user, at least one search parameter representing a desired search for a data value stored in the allocated memory;
   searching the allocated memory by accessing an index of the data map to determine a location in the allocated memory containing the data value corresponding to the search parameter; and
   copying the data value corresponding to the search parameter.

2. The method of claim 1, the searching further comprising:
   skipping to a portion of the allocated memory to perform a search based on the at least one search parameter and the data map.

3. The method of claim 1, the copying comprising:
   storing the data value corresponding to the at least one search parameter in a memory area outside of the allocated memory.

4. The method of claim 1, wherein the characteristics include data field information.

5. The method of claim 1, wherein the characteristics include data type information.

6. The method of claim 1, wherein the characteristics include data size information.

7. A method for mapping data from a network to a memory in a computer, comprising:
   generating a data map reflective of characteristics of data to be transferred to the computer, wherein the data map provides at least data type and format information that enables determination of how the data is to be stored in the memory;
   associating the data map with the data to be transferred to the computer; and
   sending the data map and associated data to the computer, wherein the computer:
      receives the data map from the network;
      allocates a section of the memory based on the data map;
      receives the associated data from the network;
      directly loads the associated data into the allocated memory according to at least the data type and format information provided in the data map;
      receives, from a user, at least one search parameter representing a desired search for a data value stored in the allocated memory;
      searches the allocated memory by accessing an index of the data map to determine a location in the allocated memory containing the data value corresponding to the search parameter; and
      copies the data value corresponding to the search parameter.

8. The method of claim 7, wherein the characteristics include data field information.

9. The method of claim 7, wherein the characteristics include data type information.

10. The method of claim 7, wherein the characteristics include data size information.

11. A method for mapping data from a network to a memory in a computer, comprising:
    receiving from the network a data map reflective of characteristics of data to be received at the node via the network, wherein the data map provides at least data type and format information that enables determination of how the data is to be stored in the memory;
    allocating a section of the memory based on the data map;
    receiving, from the network, the data associated with the data map;
    directly loading the received data into the allocated memory according to at least the data type and format information provided in the data map;
    receiving, from a user, at least one search parameter;
    searching the allocated memory by accessing an index of the data map to determine a location in the allocated memory containing a data value corresponding to the at least one search parameter; and
    copying the data value corresponding to the at least one search parameter.

12. The method of claim 11, the searching further comprising:
    skipping to a portion of the allocated memory to perform a search based on the at least one search parameter and the data map.

13. The method of claim 11, the copying comprising:
    storing the data value corresponding to the at least one search parameter in an area in memory outside of the allocated memory.

14. A method for mapping data from a network, comprising:
- receiving from the network a data map reflective of characteristics of data to be received at the node via the network, the characteristics including data size information, wherein the data map provides at least data type and format information that enables determination of how the data is to be stored in the memory;
- allocating a section of a memory based on the data map;
- receiving, from the network, the data associated with the data map;
- directly loading the received data into the allocated memory according to at least the data type and format information provided in the data map;
- receiving, from a user, at least one search parameter representing a desired search for a data value stored in the allocated memory;
- searching the allocated memory by accessing an index of the data map to determine a location in the allocated memory containing the data value corresponding to the search parameter; and
- copying the data value corresponding to the search parameter.

15. A method for mapping data from a network, comprising:
- receiving from the network a data map reflective of characteristics of data to be received at the node via the network, the characteristics including data field information and data size information, wherein the data map provides at least data type and format information that enables determination of how the data is to be stored in the memory;
- allocating a section of a memory based on the data map;
- receiving, from the network, the data associated with the data map;
- directly loading the received data into the allocated memory according to at least the data type and format information provided in the data map;
- receiving, from a user, at least one search parameter representing a desired search for a data value stored in the allocated memory;
- searching the allocated memory by accessing an index of the data map to determine a location in the allocated memory containing the data value corresponding to the search parameter; and
- copying the data value corresponding to the search parameter.

16. An apparatus for mapping data from a network, comprising:
- a processor and a memory having a program that, when executed by the processor:
    - receives from the network a data map reflective of characteristics of data to be received at the node via the network, wherein the data map provides at least data type and format information that enables determination of how the data is to be stored in the memory;
    - allocates a section of the memory based on the data map;
    - receives from the network the data associated with the data map;
    - directly loads the received data into the allocated memory according to at least the data type and format information provided in the data map;
    - receives, from a user, at least one search parameter representing a desired search for a data value stored in the allocated memory;
    - searches the allocated memory by accessing an index of the data map to determine a location in the allocated memory containing the data value corresponding to the search parameter; and
    - copies the data value corresponding to the search parameter.

17. An apparatus for mapping data from a network to a memory in a computer, comprising:
- a processor and a memory having a program that, when executed by the processor:
    - generates a data map reflective of characteristics of data to be transferred to the computer, wherein the data map provides at least data type and format information that enables determination of how the data is to be stored in the memory;
    - associates the data map with the data to be transferred to the computer; and
    - sends the data map and associated data to the computer;
- wherein the computer:
    - receives the data map from the network;
    - allocates a section of the memory in the computer based on the data map;
    - receives the associated data from the network;
    - directly loads the associated data into the allocated memory according to at least the data type and format information provided in the data map;
    - receives, from a user, at least one search parameter representing a desired search for a data value stored in the allocated memory;
    - searches the allocated memory by accessing an index of the data map to determine a location in the allocated memory containing the data value corresponding to the search parameter; and
    - copies the data value corresponding to the search parameter.

18. An apparatus for mapping data from a network, comprising:
- a processor and a memory having a program that, when executed by the processor:
- receives from the network a data map reflective of characteristics of data to be received at the node via the network, wherein the data map provides at least data type and format information that enables determination of how the data is to be stored in the memory;
- allocates a section of a memory based on the data map;
- receives from the network the data associated with the data map;
- directly loads the received data into the allocated memory according to at least the data type and format information provided in the data map;
- receives, from a user, at least one search parameter;
- searches the allocated memory by accessing an index of the data map to determine a location in the allocated memory containing a data value corresponding to the at least one search parameter, and
- copies the data value corresponding to the at least one search parameter.

19. An apparatus for mapping data from a network, comprising:
- means for receiving from the network a data map reflective of characteristics of data to be received at the node via the network, wherein the data map provides at least data type and format information that enables determination of how the data is to be stored in the memory;
- means for allocating a section of a memory according to at least the data type and format information provided in the data map;

means for receiving, from the network, the data associated with the data map;
means for directly loading the received data into the allocated memory based on the data map;
means for receiving, from a user, at least one search parameter representing a desired search for a data value stored in the allocated memory;
means for searching the allocated memory by accessing an index of the data map to determine a location in the allocated memory containing the data value corresponding to the search parameter; and
means for copying the data value corresponding to the search parameter.

20. The apparatus of claim 19, the means for searching further comprising:
means for skipping to a portion of the allocated memory to perform a search based on the at least one search parameter and the data map.

21. The apparatus of claim 19, the means for copying comprising:
means for storing the data value corresponding to the at least one search parameter in an area in memory outside of the allocated memory.

22. The apparatus of claim 19, wherein the characteristics include data field information.

23. The apparatus of claim 19, wherein the characteristics include data type information.

24. The method of claim 19, wherein the characteristics include data size information.

25. An apparatus for mapping data from a network to a memory in a computer, comprising:
means for generating a data map reflective of characteristics of data to be transferred to the computer, wherein the data map provides at least data type and format information that enables determination of how the data is to be stored in the memory;
means for associating the data map with the data to be transferred to the computer; and
means for sending the data map and associated data to the computer, wherein the computer:
receives the data map from the network;
allocates a section of the memory according to at least the data type and format information provided in the data map;
receives the associated data from the network;
directly loads the associated data into the allocated memory based on the data map;
receives, from a user, at least one search parameter representing a desired search for a data value stored in the allocated memory;
searches the allocated memory by accessing an index of the data map to determine a location in the allocated memory containing the data value corresponding to the search parameter; and
copies the data value corresponding to the search parameter.

26. A computer-readable medium containing instructions for performing a method for mapping data from a network to a memory in a computer, the method comprising:
receiving from the network a data map reflective of characteristics of data to be received at the node via the network, wherein the data map provides at least data type and format information that enables determination of how the data is to be stored in the memory;
allocating a section of the memory based on the data map;
receiving, from the network, the data associated with the data map
directly loading the received data into the allocated memory according to at least the data type and format information provided in the data map;
receiving, from a user, at least one search parameter representing a desired search for a data value stored in the allocated memory;
searching the allocated memory by accessing an index of the data map to determine a location in the allocated memory containing the data value corresponding to the search parameter; and
copying the data value corresponding to the search parameter.

27. The computer-readable medium of claim 26, the searching further comprising:
skipping to a portion of the allocated memory to perform a search based on the at least one search parameter and the data map.

28. The computer-readable medium of claim 26, the copying comprising:
storing the data value corresponding to the at least one search parameter in an area in memory outside of the allocated memory.

29. The computer-readable medium of claim 26, wherein the characteristics include data field information.

30. The computer-readable medium of claim 26, wherein the characteristics include data type information.

31. The computer-readable medium of claim 26, wherein the characteristics include data size information.

32. A computer-readable medium containing instructions for performing a method for mapping data from a network to a memory in a computer, the method comprising:
generating a data map reflective of characteristics of data to be transferred to the computer, wherein the data map provides at least data type and format information that enables determination of how the data is to be stored in the memory;
associating the data map with the data to be transferred to the computer; and
sending the data map and associated data to the computer; wherein the computer:
receives the data map from the network;
allocates a section of the memory based on the data map;
receives the associated data from the network;
directly loads the associated data into the allocated memory according to at least the data type and format information provided in the data map;
receives, from a user, at least one search parameter representing a desired search for a data value stored in the allocated memory;
searches the allocated memory by accessing an index of the data map to determine a location in the allocated memory containing the data value corresponding to the search parameter; and
copies the data value corresponding to the search parameter.

33. A system for mapping data, comprising:
a network;
a first node operable to:
generate a data map reflective of characteristics of data to be transferred to a second node;
associate the data map with the data to be transferred to the second node, wherein the data map provides at least data type and format information that enables determination of how the data is to be stored in the memory; and
send the data map and associated data to the second node; and a second node including a memory and operable to:
- receive the data map from the first computer via the network;
- allocate a section of the memory according to at least the data type and format information provided in the data map;
- receive the data associated with the data map from the first computer via the network;
- directly load the received data into the allocated memory based on the data map;
- receive, from a user, at least one search parameter;
- search the allocated memory by accessing an index of the data map to determine a location in the allocated memory containing a data value corresponding to the at least one search parameter; and
- copy the data value corresponding to the at least one search parameter.

* * * * *